United States Patent
Arslan et al.

(10) Patent No.: US 12,250,066 B2
(45) Date of Patent: Mar. 11, 2025

(54) CHANNEL-DEPENDENT MC-CDMA UTILIZING ADAPTIVE SPREADING CODES AIDED PHYSICAL LAYER SECURITY

(71) Applicant: ISTANBUL MEDIPOL UNIVERSITESI, Istanbul (TR)

(72) Inventors: Hüseyin Arslan, Istanbul (TR); Sanaz Naderi, Istanbul (TR); Hanadi Mohammad Yousef Salman, Istanbul (TR)

( * ) Notice: Subject to any disclaimer, the term of this patent is extended or adjusted under 35 U.S.C. 154(b) by 20 days.

(21) Appl. No.: 18/249,323

(22) PCT Filed: Oct. 1, 2021

(86) PCT No.: PCT/TR2021/051002
§ 371 (c)(1),
(2) Date: Apr. 17, 2023

(87) PCT Pub. No.: WO2022/086468
PCT Pub. Date: Apr. 28, 2022

(65) Prior Publication Data
US 2023/0403094 A1 Dec. 14, 2023

(30) Foreign Application Priority Data
Oct. 19, 2020 (TR) ................. 2020-16639

(51) Int. Cl.
*H04J 13/00* (2011.01)
*H04B 1/692* (2011.01)
(Continued)

(52) U.S. Cl.
CPC .......... *H04J 13/0077* (2013.01); *H04B 1/692* (2013.01); *H04B 1/7097* (2013.01); *H04J 13/12* (2013.01); *H04J 2013/0081* (2013.01)

(58) Field of Classification Search
CPC ............... H04J 13/0077; H04J 13/12; H04J 2013/0081; H04B 1/692; H04B 1/7097
See application file for complete search history.

(56) References Cited

U.S. PATENT DOCUMENTS

2005/0249298 A1    11/2005   Kim et al.
2007/0014332 A1*    1/2007   Santhoff ............... H04B 1/7163
                                                       375/E7.073
(Continued)

FOREIGN PATENT DOCUMENTS

JP    2003143111 A    5/2003
KR    20130022777 A    3/2013

OTHER PUBLICATIONS

International Search Report for corresponding PCT/TR2021/051002 dated Dec. 8, 2021.
(Continued)

*Primary Examiner* — Janice N Tieu
(74) *Attorney, Agent, or Firm* — Egbert, McDaniel & Swartz, PLLC (57) ABSTRACT

Disclosed is a channel-dependent multi-carrier code division multiple access (MC-CDMA) technique with adaptive spreading codes. Adaptive spreading codes are used for each subcarrier per user which increase the security level of conventional MC-CDMA. Two different map designs are proposed: fixed and adaptive interval maps. These maps are shared among all nodes and gives information about the spreading code sequences for corresponding channel gains.

3 Claims, 5 Drawing Sheets

(51) Int. Cl.
    *H04B 1/7097*     (2011.01)
    *H04J 13/12*     (2011.01)

(56) References Cited

U.S. PATENT DOCUMENTS

2008/0298335 A1    12/2008  Lee
2022/0109512 A1*   4/2022   Melodia .............. G06F 21/6245

OTHER PUBLICATIONS

Written Opinion of the International Searching Authority for corresponding PCT/TR2021/051002 dated Dec. 8, 2021.
Aghdam et al., "An Overview of Physical Layer Security With Finite-Alphabet Signaling", IEEE Communications Surveys & Tutorials (vol. 21, Issue: 2, Secondquarter 2019), pp. 1829-1850 DOI: 10.1109/COMST.2018.2880421 Nov. 8, 2018 (Nov. 8, 2018). [See written opinion].
Yoshimura; et al., "Channel-dependent adaptive spreading code selection in downlink MC-CDMA", 2011 IEEE 73rd Vehicular Technology Conference (VTC Spring) (pp. 1-5), IEEE DOI: 10.1109/VETECS.2011.5956760 May 18, 2011 (May 18, 2011). [See written opinion].

\* cited by examiner

CHANNEL-DEPENDENT MC-CDMA UTILIZING ADAPTIVE SPREADING CODES AIDED PHYSICAL LAYER SECURITY

TECHNICAL FIELD

In this invention, a channel-dependent multi-carrier code division multiple access (MC-CDMA) technique with adaptive spreading codes is proposed. Adaptive spreading codes are used for each subcarrier per user which increase the security level of conventional MC-CDMA. Two different map designs are proposed; fixed and adaptive interval maps. These maps are shared among all nodes and gives information about the spreading code sequences for corresponding channel gains.

PRIOR ART

Due to the broadcasting nature of wireless communication, providing secure communication is a challenge in the existence of eavesdropping attacks such as jamming which is mitigated by using spread-spectrum techniques that are adopted by the military applications [4]. In a precise manner, spread-spectrum systems generate modulated sequences using a pseudo-random generator. Without knowing what the spreading codes are, it is intractable to correctly receive or to intercept the transmitted modulated signals. Since the spreading sequences follow a known pattern shared with only legitimate users, the spreading sequences are not secure anymore in case if the eavesdropper (Eve) knows the used pattern. Achieving secure sharing is considered one of the critical challenges in wireless communication.

On the other hand, most of the proposed security solutions are based on conventional cryptography methods which are mainly sharing keys/codes among legitimate parties in a secure manner. However, these secure sharing methods are not efficient in terms of power consumption and key management which leads to be not applicable for next generations, especially for 5G and beyond networks.

CDMA and MC-CDMA are two multiple access techniques proposed earlier. In CDMA system, each user has its own code while in MC-CDMA each user's subcarrier has its own code. All the codes are picked randomly from the same codebook [9]. In conventional CDMA and MC-CDMA, codes are assumed to be known only at legitimate nodes. However, if the malicious node has access to the codes, the communication is not secure anymore. Moreover, due to randomly codes picking by legitimate nodes, there is a chance for occurring a collision in system if one code is being used by more than one user.

AIMS OF THE INVENTION AND BRIEF DESCRIPTION

The present invention is related to a method for channel-dependent MC-CDMA with adaptive spreading codes aided physical layer security in order to eliminate the disadvantages mentioned above and to bring new advantages to the related technical field.

The proposed method in this invention provides a more secure and reliable wireless communication system based on physical layer security which is more applicable for 5G and beyond networks.

The method which is proposed in this invention has solved the code-sharing issue by designing a general map at the transmitter side that can be known by all nodes; legitimate and illegitimate. Since the shared map is designed based on legitimate users' channels, Eve cannot get any benefit out of it due to its location which is more than half wavelength apart and transmitter does not take Eve's channel in the shared map design considerations.

In contrast to conventional CDMA/MC-CDMA, this invention proposes a method in which the chance of codes' collision is zero in case of perfect channel estimation and minimized in case of imperfect channel estimation.

The proposed method is based on physical layer security, no study in the literature proposes any solution for a security issue in CDMA and MC-CDMA from a physical layer security perspective. In addition, the proposed method provides reliable communication only for legitimates nodes without giving any benefits for malicious users.

The main contributions of the invention can be summarized as follows:

The proposed method solves the problems existed in the conventional methods, e.g. key/code sharing problem in the conventional cryptographic based methods. Specifically, for the future wireless network with a large number of nodes in the network, key management and sharing are becoming critical issues where secure key/code sharing methods are not efficient in terms of power consumption, key management, and higher complicated way to ensure secure sharing. On the other hand, future networks may need to support various kinds of services and scenarios with different security levels and as the conventional encryption-based method cannot provide flexible security, they are not applicable for 5G and beyond networks and systems.

This invention also solves the collision problem existed in conventional CDMA/MC-CDMA systems since the codes are picked randomly by legitimate users. Therefore, there is a probability that two users choose the same code. But in the proposed method, the channel dependent-code map is specifically designed to let each user pick one code differently than others per subcarrier with minimum probability of collision occurrence. Moreover, since this map is designed by the transmitter based on legitimate users' channels, the malicious node, even by knowing the map, cannot get any benefit out of it.

The advantages and uniqueness of the proposed method in this invention can be as;

Adaptive spreading code sequences for users multiplexed in each subcarrier increases the security level of MC-CDMA.

A channel-dependent multi-user multiplexing per subcarrier is designed in such a way increasing the confusion level at Eve side.

The confusion level at Eve increases with increasing the number of multiplexed users.

Minimizing the probability of collision occurrence in picking the spreading code sequences in case of imperfect channel estimation and achieving zero collision probability in case of perfect channel estimation by properly design the shared map.

The unique design of the shared map:

The shared map mainly relates spreading code sequences with the ranges of channel gains called quantization levels.

The quantization levels can be generated based on fixed or adaptive interval/step size.

The map design ensures that only one user per subcarrier exists in a quantization level under perfect channel estimation assumption.

The proposed method is applicable to industrialization since it provides reliable and secure communication which is specifically a critical concern in military applications. Moreover, it is applicable for 5G and beyond the application as URLLC which requires reliability and power efficiency.

DEFINITION OF THE FIGURES OF THE INVENTION

The figures have been used in order to further disclose the Channel-Dependent MC-CDMA with Adaptive Spreading Codes Aided Physical Layer Security developed by the present invention which the figures have been described below:

In FIG. 1:

UEs: legitimate receivers,

K: number of single-antenna legitimate receivers,

Eve: single-antenna eavesdropper

In this figure (FIG. 2):

WS: window size,

Thr: subcarrier threshold,

MDT: minimum difference threshold,

Idx: window index,

Num_Sub: total number of subcarriers.

DETAILED DESCRIPTION OF THE INVENTION

The novelty of the invention has been described with examples that shall not limit the scope of the invention and which have been intended to only clarify the subject matter of the invention. The present invention has been described in detail below.

The invention is providing adaptive spreading codes for each subcarrier per user which increase the security level of conventional MC-CDMA. The picked spreading code sequence is based on the user's channel gain.

Figure 1:
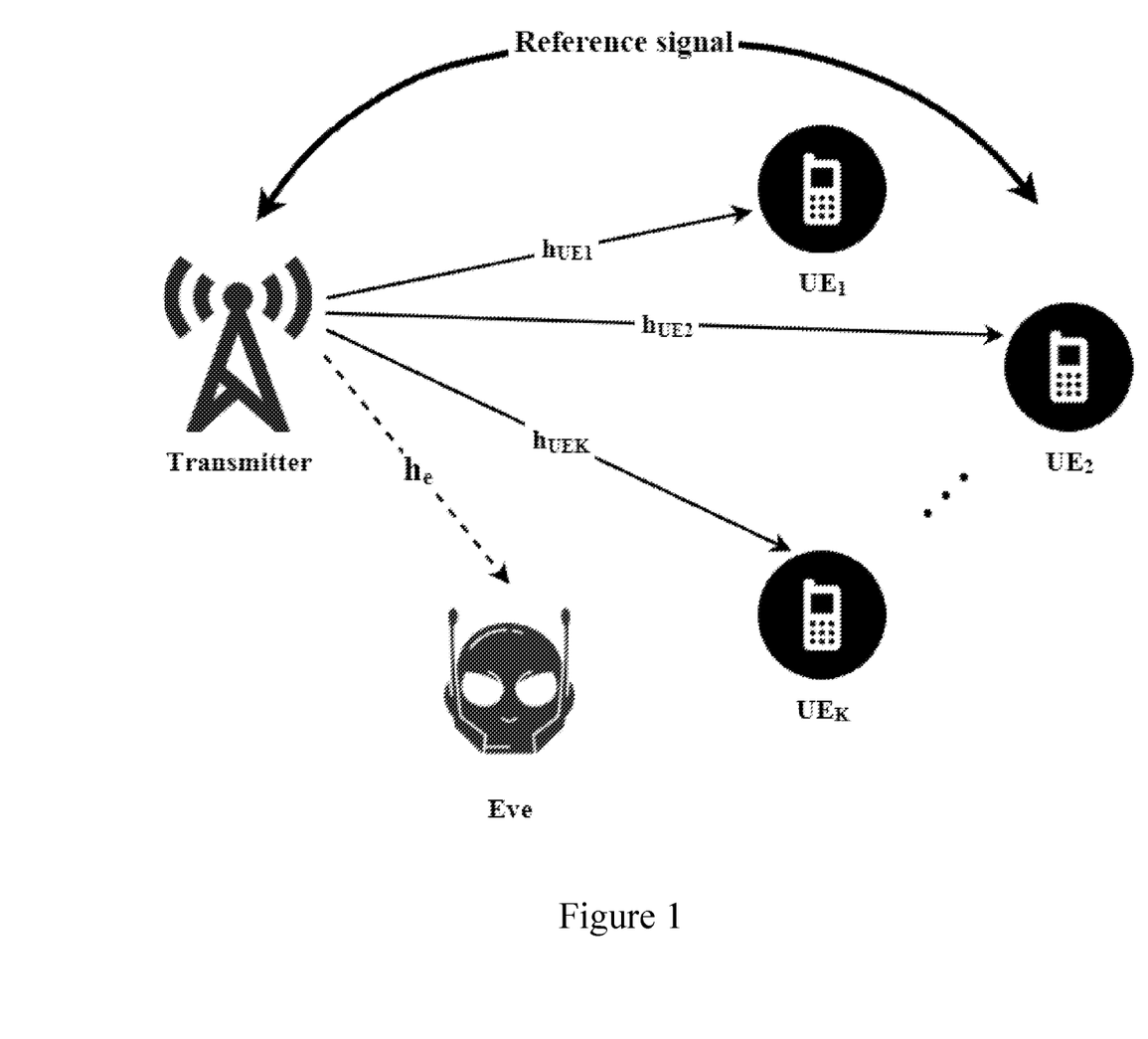
FIG. 1: Considered system model consisting of single-antenna transmitter, legitimate users and Eve.

The considered scenario in this invention contains a transmitter communicates securely with K legitimate users (UEs) in the presence of a passive eavesdropper (Eve) as shown in FIG. 1. Eve's goal is to intercept the secret message from the communication link between transmitter and k-th UE through its own observations of the signals. Eve can be stronger than any user in the sense of having multiple antennas, off-line processing, more power, hardware capabilities, and better signal processing skills. Moreover, it is assumed that Eve location is not known by the transmitter and its channel is independent and uncorrelated from UEs, i.e. Eve is located at least half-wavelength apart from UEs. Exploiting reciprocity property in a time-division duplexing (TDD) [7] system, the transmitter has the channel state information (CSI) of all UEs in the coverage area and does not have any information about Eve's channel, since it is considered as a passive. Also, it is assumed that all received signals experience Rayleigh frequency-selective fading channels.

In this invention, the transmitter has the ability to estimate the channels with all UEs using the reference signals. Following the channel reciprocity property in TDD mode, the downlink channel is the same as uplink [8] so that there is no need to share the channel between the transmitter and any UE. The proposed method in this invention used MC-CDMA as a multiple access scheme.

A. Algorithms for Quantization Level Design:

The proposed method ensures security by designing a legitimate user channel-dependent map which includes quantization levels and the corresponding spreading code sequences. The map design is done at the transmitter side after the channel estimation stage. First, the transmitter looks to the channel frequency response (CFR) of all UEs. Then a window with specific length on CFR is defined. The window length is assumed to be one (for the sake of illustration) means in each window only one subcarrier exists. A quantization levels are designed to map the users' channel gains with the corresponding spreading codes. Based on the step size between two consecutive quantization levels, fixed and adaptive quantization levels are illustrated. Based on the quantization level index, the spreading code sequence is picked from pre-defined codebook in a scheduled manner.

1) Fixed Interval Quantization Level

Fixed interval quantization level implies that the step size between any two consecutive levels are constant and the probability to have two or more users per window at same quantization level is high. To cope with this issue, the proposed method uses four techniques:

Only strong subcarriers per user are used for data transmission, i.e. deep fade subcarriers are removed, which reduces the channel gains range and leads to shorter spreading code length.

A minimum difference threshold (MDT) is pre-defined to keep in each window only the users with the difference between their channel gains is satisfied MDT and others are removed (e.g. if three UEs are active in the system and the difference between channel gains of two UEs is less than pre-defined MDT, both UEs are not allowed to be active in this window to avoid collision between these two UE's data while the third UE uses this window alone).

For the sake of accurate detection, an extra map, i.e. scheduled map, needs to be publicly shared. In this scheduled map, each user learns how many users multiplexed per window.

An operation method of map design with fixed interval;

1. A window size (WS) is defined which shows total number of considered subcarriers in every window.

2. A threshold (Thr) is defined as a criteria to select strong subcarriers. This threshold can be the average of whole channel gains. If the considered subcarrier's channel gain is above Thr, it is considered as strong subcarrier.

3. Total number of subcarriers and window index are defined by Num-Sub and Idx, respectively.

4. Choosing the strong subcarriers, i.e. higher than a threshold, for each UE,

5. Initiate the Idx value with 1,

6. Checking the difference between all consecutive UEs' channel gains per each window, 7. If the difference between them is less than MDT, both related channel gains are removed, 8. Else, move to next step 9. Check if Idx is reach to the total number of windows which is defined as (Num_Sub/WS), if Yes, go to the next step. If No, increase Idx by 1 and go back to step 6.

10. Defining the maximum and minimum channel gains among all UEs' channel gains, denoted by Max and MM, respectively,
11. Defining the fixed interval (FI) quantization level as $$FI = \frac{Max - Min}{MDT},$$

12. Defining the code length as $M=2^{\lceil log_2(FI) \rceil}$ where $\lceil \cdot \rceil$ is a ceiling function,
13. Channel gain ranges can be defined as: [Min Min+FI Min+2FI ... Max]$_{1 \times (M+1)}$
14. Quantization level indexes can be defined as, $i \in \{1, 2, \ldots, M\}$. For example, the k-th UE can be in first quantization level (i.e. i=1) if $H_{UE_k} \in$ [Min, Min+FI],
15. Generating codebook, i.e. $C^{M \times M}$, where all codes are orthogonal,
16. Generating shared map, i.e. quantization levels vs orthogonal codes, where i-th spreading code sequence assigned to i-th quantization level.

Figure 2:
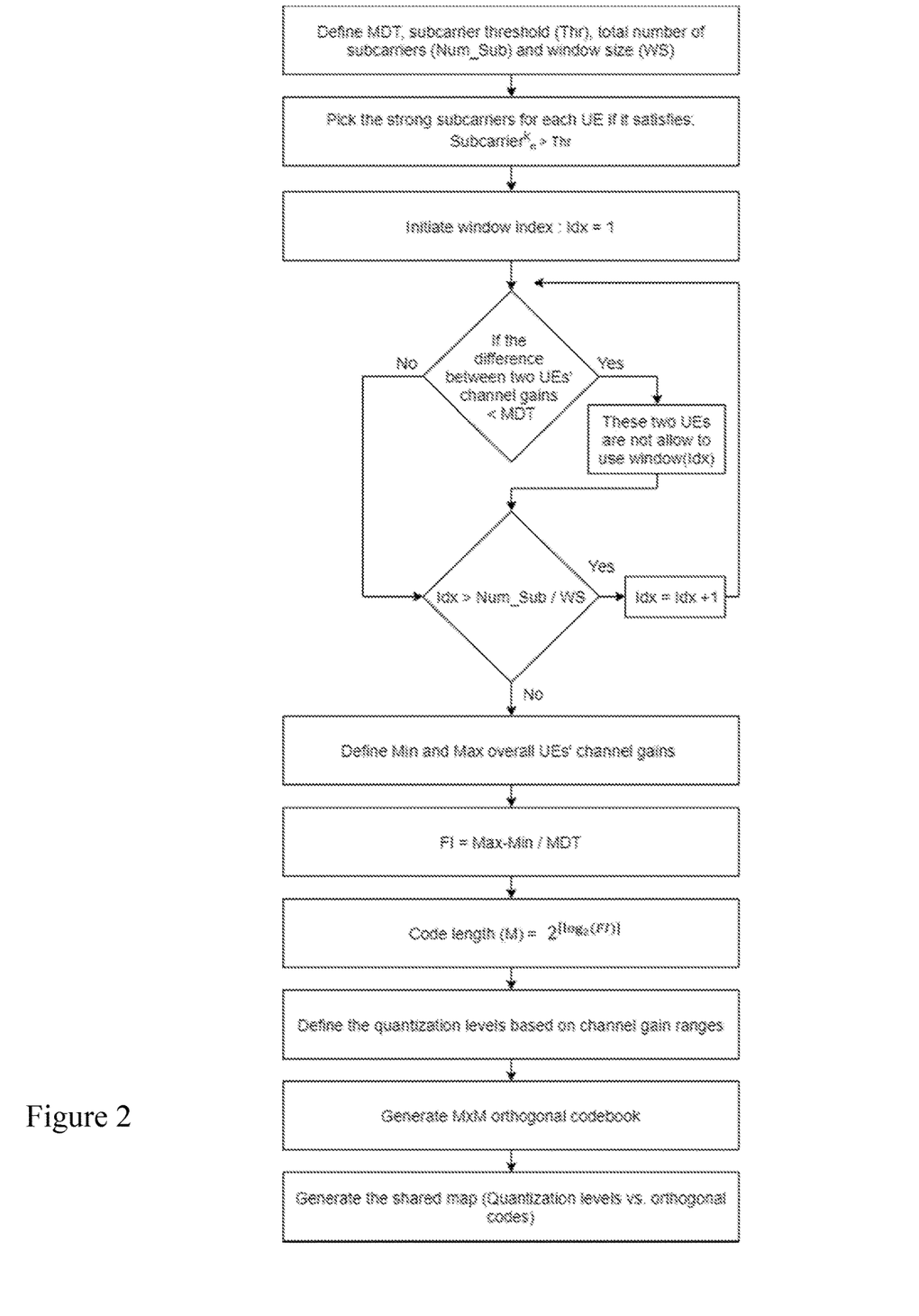
FIG. 2: Flowchart for fixed interval map design

FIG. 2 shows all the related steps to design the fixed interval quantization levels.

Figure 3:
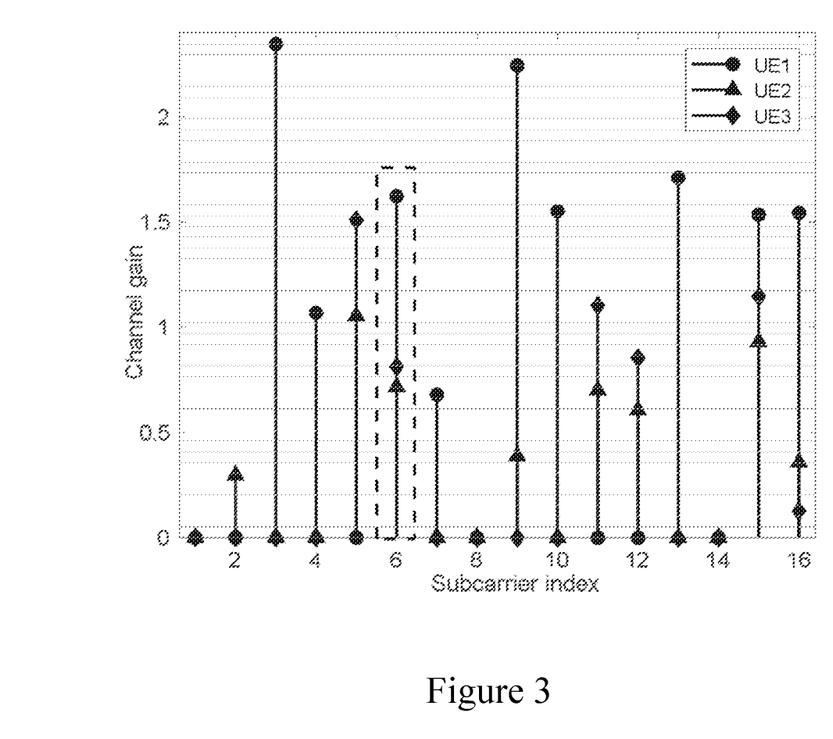
FIG. 3: An example for fixed interval quantization levels with 16-subcarriers for three multiplexed users

Issues related to fixed interval Quantization levels;
1. Requires an extra shared map (i.e. scheduled map) which can reduce the security level where Eve can try whole codes from the shared map to decode that specific symbol in case only one user using that window.
2. Losing spectral efficiency:
   Using only strong subcarriers for data transmission.
   Satisfying the MDT to have only one UE in each level per window.
3. Highly sensitive to imperfect channel estimation which degrades the UE performance
4. MDT selection is a critical issue, e.g. if MDT is very small to save more users per window, higher number of quantization levels and longer codes' length is required. FIG. 3 shows an example of fixed interval quantization levels for three users with 16 subcarriers.

2) Adaptive Interval Quantization Level

Adaptive interval quantization levels are proposed to solve all the aforementioned problems in fixed interval quantization levels. In this design, all multiplexed users use all the subcarriers for data transmission means no losses in spectral efficiency and no need for extra shared map (i.e. scheduled map) which improves the security level compared with fixed interval quantization levels.

Operation method of an adaptive interval map design;
1. A window size (WS) is defined which shows total number of considered subcarriers in every window.
2. Total number of subcarriers and window index are defined by Num-Sub and Idx, respectively.
3. Number of multiplexed users is defined as K.
4. Starting from first window (Idx=1), distinguish the UEs' channel gains with K different quantization levels,
   Define the UEs' channel gains in the window as $H = \{H_{UE_1}, H_{UE_2}, \ldots, H_{UE_K}\}$,
   Sort the UEs' channel gains in a descending manner, for ease of illustration assume that the order is as follows: $H_{UE_1} \leq H_{UE_2} \leq \ldots \leq H_{UE_K}$,
   Initiate channel gain ranges as:

$$\left[ min(H), \frac{H_{UE_1} + H_{UE_2}}{2}, \ldots, \frac{H_{UE_{K-1}} + H_{UE_K}}{2}, max(H) \right]$$

where min(H) and max(H) denote the maximum and minimum channel gain in this window,
5. Moving to the next windows (Idx=Idx+1), the quantization levels are increased only to keep the UEs' channel gains per window distinguishable,
6. Check if Idx is reach to the total number of windows which is defined as (Num_Sub/WS), if Yes, go to the next step. If No, increase Idx by 1 and go back to step 5.
7. Defining the code length as $M=2^{\lceil log_2(AQL) \rceil}$, where AQL is the total number of quantization levels with adaptive interval,
8. Generating codebook, i.e. $C^{M \times M}$, where all codes are orthogonal,
9. Generating shared map, i.e. quantization levels vs orthogonal codes, where i-th spreading code sequence assigned to i-th quantization level.

Figure 4:
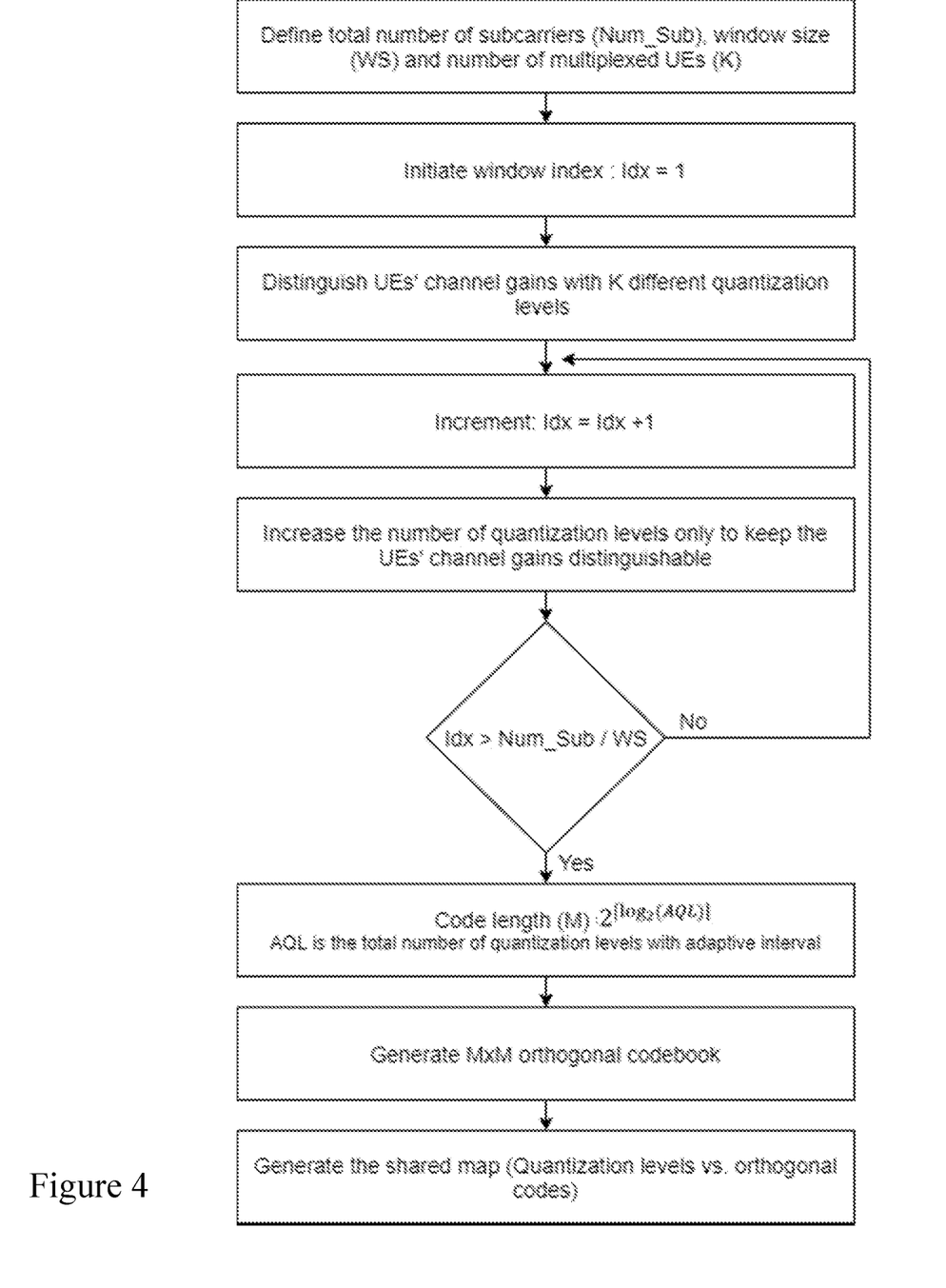
FIG. 4: Flowchart for adaptive interval map design
Figure 5:
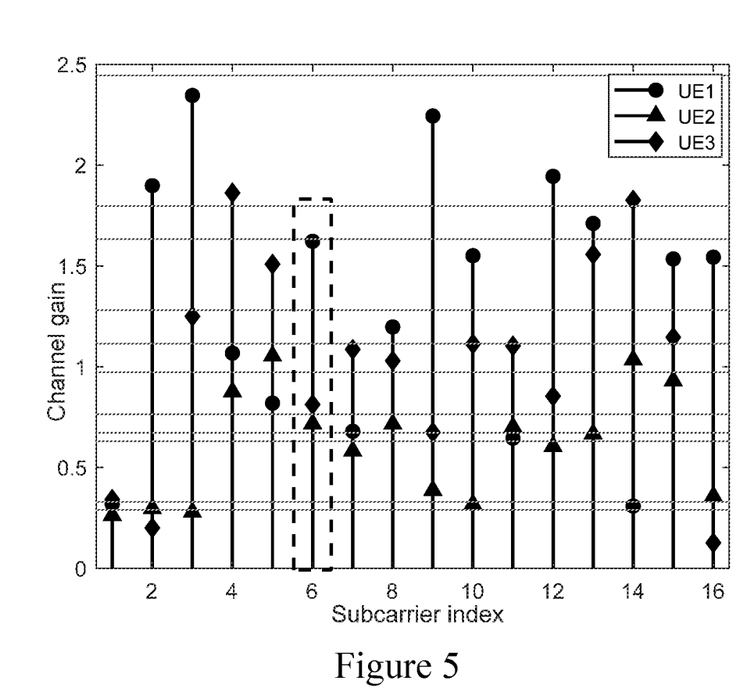
FIG. 5: An example for adaptive interval quantization levels with 16-subcarriers for three multiplexed users

FIG. 4 shows all the related steps to design the adaptive interval quantization levels FIG. 5 shows an example of adaptive interval quantization levels for three users with 16 subcarriers.

Regarding to the mentioned drawbacks of fixed interval map, adaptive interval map is used in the following sections. The shared map among all nodes is as follows;

$$Map = \begin{bmatrix} QL_1 & c_1 \\ \vdots & \vdots \\ QL_N & c_N \end{bmatrix} \quad (1)$$

Where each quantization level (QL) is mapped to a corresponding spreading code (c)

B. Signal Processing Analysis:
1) Transmitter

After designing the map design with I-quantization levels and I corresponding spreading code sequence, each UE's symbol, $S_k^n$, spreads over all N subcarriers using the selected spread code sequence $c_i \in \mathbb{C}^{M \times 1}$, $i \in \{1, \ldots, I\}$ from a predefined set $\mathcal{C} = \{c_1, c_2, \ldots, c_I\}$. To enable low complexity detection at the receiver, the spreading codes in $\mathcal{C}$ should be mutually orthogonal, which limits the maximum size of $\mathcal{C}$ to be N. Then the n-th symbol of the k-th UE, $S_k^n$, is spread across N subcarriers by the selected spreading code $c_i$, yielding $$x_k^n = [x_{k,1}^n, \ldots, x_{k,N}^n] = S_k^n c_i = [S_k^n c_{i,1}, \ldots, S_k^n c_{i,N}]^T \quad (2)$$

where $c_{i,n}$, $n \in \{1, \ldots, N\}$ is the n-th element of $c_i$. After obtaining $x_k^n$ for all K UEs, the users are multiplexed in such a way that $x^n = \Sigma_{k=1}^K x_k^n$. Then, the OFDM block creator concatenates them yielding N×1 main OFDM block as follows:

$$x = [x_1, \ldots, x_N]^T = [x_1^{(1)}, \ldots, x_N^{(1)}, \ldots, x_1^{(N)}, \ldots, x_N^{(N)}]^T \quad (3)$$

Afterwards, the remaining procedures are the same as those of classical OFDM. First, x is processed by the inverse fast Fourier transform (IFFT), yielding the time domain OFDM block $$x_{Time} = [X_1, \ldots, X_N]^T = \frac{1}{\sqrt{N}} W_N^H x \quad (4)$$

Where $W_N$ is the N×N DFT matrix with $W_N^H W_N = N I_N$. A length-L cyclic prefix (CP) is added to the beginning of $x_{Time}$. After the parallel to serial ad digital to analog conversions, the data transmitted over the frequency selective Rayleigh fading channel, whose impulse response is given by $h_T=[h_{T,1}, \ldots, h_{T,v}]^T$, where v is the number of channel taps and each entry of $h_T$ is a circularly symmetric complex Gaussian random variable. Note that L is chosen to be larger than v to combat the inter-symbol interference.

2) Receiver

The broadcasted signal is represented in time-domain as $x_{Time}$. The received signal can be presented as follows.

$$r = XH + w \quad (5)$$

Where $X=\text{diag}(x)$, H is the N×1 frequency domain channel vector, and $w \in \mathbb{C}^{N \times 1}$ is the noise vector in the frequency domain. After removing CP and applying serial-to-parallel (S/P) conversion on the time-domain received signal, FFT is applied on the resulting signal and zero-forcing channel equalization process is done to remove the effect of the channel. In practical systems, the channel vector H is estimated at the receiver as:

$$\hat{H} = H + H_e \quad (6)$$

where $H_e \in \mathbb{C}^{N \times 1}$ represents the vector of channel estimation errors with the distribution $\mathcal{CN}(0, \sigma_e^2 I_N)$ and it is independent of H.

Since the shared map and the transmitted signal are broadcasted any user can decode the data following the instructions, To decode the n-th symbol:
Check the channel gain at n-th subcarrier,
Check the corresponding quantization level based on channel gain ranges.
Select the corresponding spreading code based on the shared map.
Divide the n-th transmitted OFDM symbol by the selected spreading code,
Sum the outputs of division
If the sum is positive, the transmitted symbol is 1, otherwise, its 0, BPSK modulation is assumed to be used.

Since, the transmitter did not take Eve' channel gain in the shared map design consideration, Eve cannot decode any of the symbols and cannot understand any message.

Depending on the all information above, the operation method of channel-dependent MC-CDMA with adaptive spreading codes aided physical layer security, comprising the steps of;

Adaptive interval map design process;
1. Starting from first window, distinguish the UEs' channel gains with K different quantization levels, Defining of the UEs' channel gains in the window as $H = \{H_{UE_1}, H_{UE_2}, \ldots, H_{UE_K}\}$,
Sorting of the UEs' channel gains in a descending manner, for ease of illustration assume that the order is as follows: $H_{UE_1} \leq H_{UE_2} \leq H_{UE_K}$,
Initiating of channel gain ranges as:

$$\left[\min(H), \frac{H_{UE_1} + H_{UE_2}}{2}, \ldots, \frac{H_{UE_{K-1}} + H_{UE_K}}{2}, \max(H)\right]$$

where min(H) and max(H) denote the maximum and minimum channel gain in this window,
2. Moving to the next windows, the quantization levels are increased only to keep the UEs' channel gains per window distinguishable,
3. Defining the code length as $M = 2^{\lceil \log_2(AQL) \rceil}$, where AQL is the total number of quantization levels with adaptive interval,
4. Generating of the codebook, i.e. $C^{M \times M}$, where all codes are orthogonal,
5. Generating of the shared map, i.e. quantization levels vs orthogonal codes, where i-th spreading code sequence assigned to i-th quantization level,
6. After map design process, passing signal process for decoding,
7. Completion of signal process for decoding.

According the method 1, wherein said signal process for decoding comprises legitimate user decoding or illegitimate user decoding.

Legitimate user decoding in signal process steps are explained below.

Data decoding process at receiver side comprising the steps of;
each user data per subcarrier spreads by code chosen from the shared map based on its channel gain at that subcarrier index which is explained mathematically as follows:
Defining the n-th symbol of the k-th UE, $S_k^n$, is spread across N subcarriers by the selected spreading code $c_i$, $$x_k^n = [x_{k,1}^n, \ldots, x_{k,N}^n] = S_k^n c_i = [S_k^n c_{i,1}, \ldots, S_k^n c_{i,N}]^T \quad (1)$$

Creating orthogonal frequency division multiplexing (OFDM) block signal for all users which contains N×1 main OFDM block defined as $$x = [x_1, \ldots, x_N]^T = [x_1^{(1)}, \ldots, x_N^{(1)}, \ldots, x_1^{(N)}, \ldots, x_N^{(N)}]^T \quad (2)$$

After the inversing of fast Fourier transform (IFFT) process and cyclic prefix (CP), representing of the broadcasted signal time-domain as x, $$x_{Time} = [X_1, \ldots, X_N]^T = \frac{1}{\sqrt{N}} W_N^H x \quad (3)$$

Where $W_N$ is the N×N DFT matrix with $W_N^H W_N = NI_N$.
Receiving of the signal at user side as $$r = XH + w \quad (4)$$

After removing CP and applying serial-to-parallel (S/P) conversion on the time-domain received signal, r, applying of fast Fourier transform (FFT) on the result signal,
Processing of zero-forcing channel equalization to remove the effect of the channel,
Since the shared map and the transmitted signal are broadcasted, any user can decode the data following the instructions, To decode the n-th symbol:
Checking of the channel gain at n-th subcarrier,
Checking of the corresponding quantization level based on channel gain ranges.
Selection of the corresponding spreading code based on the shared map.
Dividing of the n-th transmitted OFDM symbol by the selected spreading code,
Summation the outputs of division
If the summation is positive, the transmitted symbol is 1, otherwise, its 0,

REFERENCES

[1] Yoshimura, S., & Higuchi, K. (2011, May). Channel-dependent adaptive spreading code selection in downlink MC-CDMA. In 2011 IEEE 73rd Vehicular Technology Conference (VTC Spring) (pp. 1-5). IEEE.
[2] Hamamreh, J. M., Basar, E., & Arslan, H. (2017). OFDM-subcarrier index selection for enhancing security and reliability of 5G URLLC services. IEEE Access, 5, 25863-25875.
[3] Boyd, S. W., & Pursley, M. B. (2013). Adaptive direct-sequence spread-spectrum for packet radio networks. IEEE Transactions on Aerospace and Electronic Systems, 49(4), 2554-2569.
[4] Hermanns, F. (2004). Cryptographic CDMA code hopping (CH-CDMA) for signal security and anti-jamming EMPS 2004.
[5] Wang, Q. (2017, May). Using secret spreading codes to enhance physical layer security in wireless communication. In 2017 IEEE international conference on communications workshops (ICC workshops) (pp. 447-450). IEEE.
[6] Kang, T., Li, X., Yu, C., & Kim, J. (2013). A survey of security mechanisms with direct sequence spread spectrum signals. Journal of Computing Science and Engineering, 7(3), 187-197.
[7] X. Zhou, L. Song, and Y. Zhang, Physical Layer Security in Wireless Communications. CRC Press, 2016.
[8] A. Goldsmith, Wireless Communications. Cambridge University Press, 2005.
[9] Ipatov, Valeri P. Spread spectrum and CDMA: principles and applications. John Wiley & Sons, 2005.

The invention claimed is:

1. A method of operating Channel-Dependent multi-carrier code-division multiple access (Mc-CDMA) with Adaptive Spreading Codes Aided Physical Layer Security, the method comprising:
  distinguishing legitimate receivers (UEs') channel gains with different quantization levels, the step of distinguishing being in a first window:
  defining the UEs' channel gains in the first window as $H=\{H_{UE_1}, H_{UE_2}, \ldots, H_{UE_K}\}$;
  sorting the UEs' channel gains in a descending manner as $H_{UE_1} \leq H_{UE_2} \leq \ldots H_{UE_K}$;
  initiating channel gain range as $$\left[\min(H), \frac{H_{UE_1}+H_{UE_2}}{2}, \ldots, \frac{H_{UE_{K-1}}+H_{UE_K}}{2}, \max(H)\right]$$

where the min (H) and the max (H) denote a minimum channel gain and a maximum channel gain in the first window;
  moving to a next window to increase quantization so as to keep the UEs' channel gains distinguishable in the next window;
  defining a code length as $M=2^{\lceil log_2(AQL) \rceil}$ in which an acceptable quality limit (AQL) is a total number of quantization levels with respective adaptive intervals;
  generating a codebook ($C^{M \times M}$) in which codes therein are orthogonal;
  generating a shared map of quantization levels versus orthogonal codes in which a spreading code sequence is assigned to an quantization level;
  passing a signal process for decoding after generating the shared map;
  completing the passed signal process for decoding.

2. The method of claim 1, wherein the signal process for decoding has a decoding of a legitimate user and a decoding of an illegitimate user.

3. The method of claim 2, wherein the decoding of the legitimate user comprises:
  spreading of each user data per subcarrier by code chosen from the generated shared map based on a channel gain at a subcarrier index.

* * * * *